United States Patent [19]

Mizokami

[11] Patent Number: 4,509,845

[45] Date of Patent: Apr. 9, 1985

[54] APPARATUS FOR CONTROLLING THE EMISSION OF AN ELECTRONIC FLASH

[75] Inventor: Kazunori Mizokami, Hachioji, Japan

[73] Assignee: Olympus Optical Company Ltd., Tokyo, Japan

[21] Appl. No.: 514,173

[22] Filed: Jul. 15, 1983

[30] Foreign Application Priority Data

Sep. 28, 1982 [JP] Japan .......................... 57-147589[U]

[51] Int. Cl.³ .............................................. G03B 15/05
[52] U.S. Cl. ...................................... 354/420; 354/480
[58] Field of Search ............... 354/413, 414, 420, 479, 354/480

[56] References Cited

U.S. PATENT DOCUMENTS

| | | | |
|---|---|---|---|
| 4,284,341 | 8/1981 | Yamada | 354/480 |
| 4,357,084 | 11/1982 | Kimura | 354/480 |
| 4,422,743 | 12/1983 | Izumi et al. | 354/480 |
| 4,429,966 | 2/1984 | Hosoe et al. | 354/480 |
| 4,443,081 | 4/1984 | Suzuki | 354/479 |

FOREIGN PATENT DOCUMENTS 55-140825  11/1980  Japan.

Primary Examiner—Russell E. Adams
Attorney, Agent, or Firm—Louis Weinstein

[57] ABSTRACT

An apparatus for controlling the emission of an electronic flash is provided, which is used with a photographic camera of the type in which the photometry of reflection from a film surface is effected. The apparatus calculates an exposure period on the basis of TTL photometric value which prevails before shutter release, displays such exposure period, compares it against a synchronized period, and causes an integrating operation of a photocurrent to be delayed a given time interval if it is decided that the calculated period is greater than the synchronized period.

4 Claims, 3 Drawing Figures

APPARATUS FOR CONTROLLING THE EMISSION OF AN ELECTRONIC FLASH

BACKGROUND OF THE INVENTION

The invention relates to an apparatus for controlling the emission of an electronic flash which is used in a photographic camera of the type in which the photometry of reflection from a film surface is effected, and more particularly, to such apparatus which may be used in combination with a single lens reflex camera of the type effecting photometry of reflection from a film surface in order to control the emission of flashlight from a TTL (through-the-lens) "automatic electronic flash" used in combination therewith.

A single lens reflex camera employing a focal plane shutter and arranged to effect the photometry of reflection from a film surface is known in the prior art, which includes double switch means comprising a first switch which is changed from its off to its on condition in synchronism with the completion of running of a first blind of the shutter, and a second switch which is changed from its on to its off condition in synchronism with the initiation of running of a second blind, the first and the second switches being connected in series and the X-contacts of an electronic flash being closed only when both switches are turned on. The double switch means disables the X-contacts for a shutter period which is less than the time required to achieve a full opening of the focal plane shutter, by detecting the fully open condition thereof, and thus is operative to provide a control on the basis of an actual result of shutter running. Accordingly, when an electronic flash is mounted on a single lens reflex camera incorporating such double switch means to enable a TTL "automatic electronic flash" photography, it is difficult to predict if the emission of flashlight from the electronic flash occurs reliably before the shutter release takes place.

It is possible to determine if the emission of flashlight from an electronic flash occurs in all probabilities, by performing an APEX calculation of TTL photometric value beforehand to see if a resulting shutter period is less than the time required to achieve a full opening of a focal plane shutter. However, with this approach, if the shutter period displayed in accordance with the APEX calculation is close to the time required to achieve a full opening of the shutter (for example, 1/60 second), a precision in the display presents a problem. Also, the displayed value does not always match an actual period determined on the basis of the photometry of a film surface, with the result that the occurrence of the emission of flashlight from an electronic flash cannot be determined unless the shutter release actually takes place. Thus it will be seen that an emission control may not be coincident with a prior recognition of a photographer.

SUMMARY OF THE INVENTION

In view of the foregoing, it is an object of the invention to provide an apparatus for controlling the emission of an electronic flash used in a photographic camera of the type in which the photometry of reflection from a film surface is effected, wherein an exposure period is determined before the shutter release as a result of a calculation from the photometry of reflection from a film surface and is compared against a synchronized shutter period to determine if the emission of flashlight from TTL "automatic electronic flash" takes place, and wherein in the event a signal is obtained by the determination that the emission from the electronic flash will occur, this signal is utilized to delay the initiation of an integrating operation of a photocurrent by a given time interval with respect to the beginning of running of a first blind of the shutter.

In accordance with the invention, the initiation of an integrating operation of a photocurrent is delayed by a given time interval with respect to the beginning of running of the first blind whenever the emission from an electronic flash should occur, thereby assuring that an actual period based on the integral exceeds the synchronized period. In this manner, the emission from the electronic flash is controlled so as to be coincident with the shutter period displayed before the shutter release takes place, and an exposure control is enabled in which the significance of flashlight from the electronic flash is relied upon.

DESCRIPTION OF PREFERRED EMBODIMENT

Figure 1:
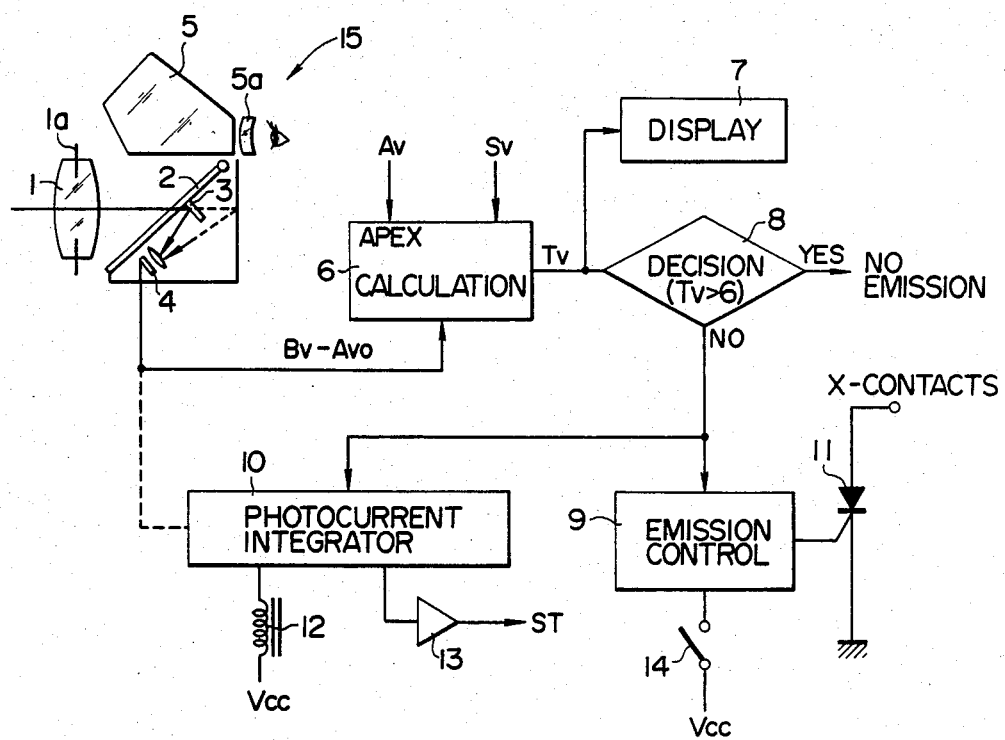
FIG. 1 is a block diagram of a general arrangement of the apparatus according to one embodiment of the invention.

Referring to FIG. 1, a general arrangement of an apparatus for controlling the emission of an electronic flash used in a photographic camera of the type in which the photometry of reflection from a film surface is effected which is constructed according to one embodiment of the invention is shown. It is to be understood that the apparatus is assembled into a single lens reflex camera 15 which effects TTL (through-the-lens) photometry of reflection from a film surface schematically shown. Specifically, camera 15 includes a taking lens 1 associated with a lens diaphragm 1a. Before the shutter release takes place, light passing through the diaphragm 1a passes through a half mirror section, which is centrally formed in a movable reflecting mirror 2, to be totally reflected by an auxiliary reflecting mirror 3 which is disposed on the backside of the movable mirror, thus impinging upon a photoelectric transducer element 4 which is located in the bottom of the camera for purpose of the photometry. Part of the incident light is reflected by the movable mirror 2 and is directed by a pentaprism 5 to an eyepiece 5a. Before the shutter release takes place, the transducer element 4 produces an output which is determined by a difference between the brightness value Bv of an object being photographed and an open diaphragm aperture Avo, and which is fed to an APEX calculation circuit 6. An aperture value Av and film speed Sv are also supplied to the circuit 6, which then derives a time value Tv indicative of an exposure period, by APEX calculation. A display circuit 7 is located within a finder of the camera and displays the time value Tv calculated in this manner, allowing a photographer to recognize an exposure period corresponding to the time value Tv. The time value Tv is also fed from the circuit 6 to a decision circuit 8 in synchronism with a shutter release. The decision circuit 8 determines if the time value exceeds a synchronized period (shutter fully open timing), for example, Tv=6 (1/60 second). If Tv>6, namely, if the time value is less than the synchronized timing, the electronic flash is controlled so as not to trigger the emission of flashlight. If Tv≦6, a corresponding signal is fed to an emission control circuit 9 and a photocurrent integrator 10, thus effecting a control over the emission of flashlight from the electronic flash.

Specifically, the emission control circuit 9 operates to render a thyristor 11 conductive when an X-contact switch 14 is turned on as the shutter becomes fully open, thus triggering the emission of flashlight from the electronic flash. It will be seen that since the movable mirror 2 bounces up in synchronism with the shutter release, the transducer element 4 subsequently receives reflected light from a film surface and a surface of a first blind of the shutter. The output of the transducer element 4 is fed to the photocurrent integrator 10, thus integrating the photocurrent. In accordance with the invention, the initiation of an integrating operation of the photocurrent by the integrator 10 is delayed by a given time interval with respect to the beginning of running of the first blind, thereby assuring that an actual exposure period calculated on the basis of the photometry exceeds the synchronized timing. This avoids the emission of flashlight from the electronic flash when the actual exposure period determined by the integral of the reflective photometry is less than the synchronized timing, due to the precision of display of the result of APEX calculation or a difference between the value displayed and the actual period determined by the photometry of the reflection from the film surface. When the integral reaches a given value, the integrator 10 operates to deenergize an electromagnet 12 which is used to constrain a second blind of the shutter from running, thus allowing the second blind to run. Also, the integrator 10 produces a signal which is fed through an inverter 13 to deliver an emission terminate signal ST, which is effective to cease the emission of flashlight from the electronic flash.

Figure 2:
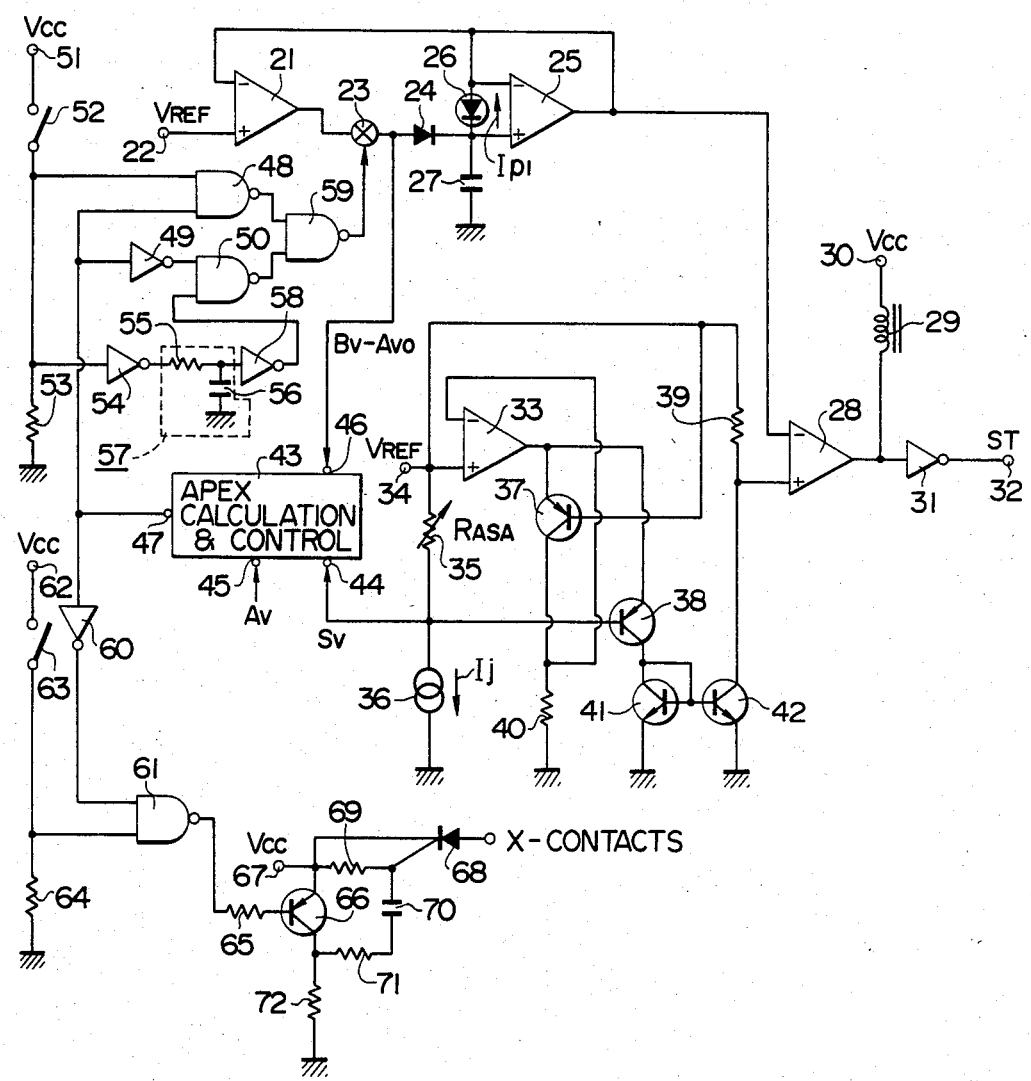
FIG. 2 is a circuit diagram of a specific form of apparatus shown in FIG. 1.

FIG. 2 shows a specific circuit arrangement of the apparatus shown in FIG. 1. Specifically, an operating amplifier 21 is shown having its non-inverting input connected to a terminal 22, to which a reference voltage $V_{REF}$ is applied. The output terminal of the amplifier 21 is connected through an analog switch 23 to the anode of a diode 24 which is employed to provide a logarithmic compression. The cathode of the diode 24 is connected to the non-inverting input of an operational amplifier 25, with a photoelectric transducer element 26, used for purpose of photometry, connected between the inverting and the non-inverting input thereof, with the anode of the element 26 connected to the inverting input. It is to be understood that the transducer element 26 corresponds to the transducer element 4 shown in FIG. 1. An integrating capacitor 27 is connected between the non-inverting input of the amplifier 25 and the ground. The output of the amplifier 25 is connected to the inverting inputs of the amplifiers 25 and 21, and is also connected to the inverting input of an operational amplifier 28, which operates as a comparator. The output of the amplifier 28 is connected through an electromagnet 29 the same as 12 in FIG. 1 used to constrain a second blind of the shutter from running, to a terminal 30, to which a supply voltage Vcc is applied. The output is also connected through an inverter 31 same as 13 in FIG. 1 to a terminal 32 where an emission terminate signal ST is delivered for application to the electronic flash.

An operational amplifier 33 includes a non-inverting input connected to a terminal 34, to which the reference voltage $V_{REF}$ is applied, and which is also connected to the ground through a series combination of a variable resistor 35, used to preset a film speed, and a constant current source 36. The output of the amplifier 33 is connected to the emitters of PNP transistors 37 and 38. The transistor 37 has its base connected to the terminal 34 and also connected through a resistor 39 to the non-inverting input of the amplifier 28. The collector of the transistor 37 is connected to the inverting input of the amplifier 33 and is also connected through a resistor 40 to the ground. The collector of the transistor 38 is connected to the collector and base of an NPN transistor 41 and is also connected to the base of an NPN transistor 42. The emitters of the transistors 41 and 42 are connected to the ground and they form a current mirror circuit. The base of the transistor 38 is connected to the junction between the resistor 35 and the source 36, which junction is also connected to a film speed input 44 of an APEX calculation and control circuit 43, which also includes a diaphragm input 45, which is supplied with an aperture value corresponding to a diaphragm aperture of the camera, by an arrangement not shown. The circuit 43 also includes a brightness input 46 which is connected to the anode of the logarithmic compression diode 24. The circuit 43 corresponds to the combination of APEX calculation circuit 6 and decision circuit 8 shown in FIG. 1.

The circuit 43 has an output terminal 47 which is connected to one input of NAND gate 48 and is also connected through an inverter 49 to one input of NAND gate 50. A series combination of a trigger switch 52 and a resistor 53 is connected across a terminal 51, to which the supply voltage Vcc is applied, and the ground. The trigger switch 52 is closed upon completion of a shutter winding operation, and is open in response to the running of the first blind of the shutter. The junction between the switch 52 and resistor 53 is connected to the other input of the gate 48 and is also connected to the other input of the gate 50 through an inverter 54, a delay circuit 57 including resistor 55 and a capacitor 56, and an inverter 58. The outputs of the gates 48, 50 are connected to the inputs of NAND gate 59, the output of which is connected to the control terminal of the analog switch 23.

The output 47 of the circuit 43 is also connected through an inverter 60 to one input of NAND gate 61, the other input of which is connected to the junction between X-contact switch 63 and resistor 64, connected in series between a terminal 62, to which the supply voltage Vcc is applied, and the ground. The output of the gate 61 is connected through a resistor 65 to the base of PNP transistor 66. The transistor 66 has its emitter connected to a terminal 67, to which supply voltage Vcc is applied, and also connected to the cathode of a thyristor 68. The thyristor 68 has a gate which is connected through a discharge resistor 69 to the emitter of the transistor 66 and also connected to the collector of the transistor 66 through a series combination of a trigger capacitor 70 and a charging resistor 71. The collector of the transistor 66 is connected to the ground through a charging resistor 72.

Figure 3:
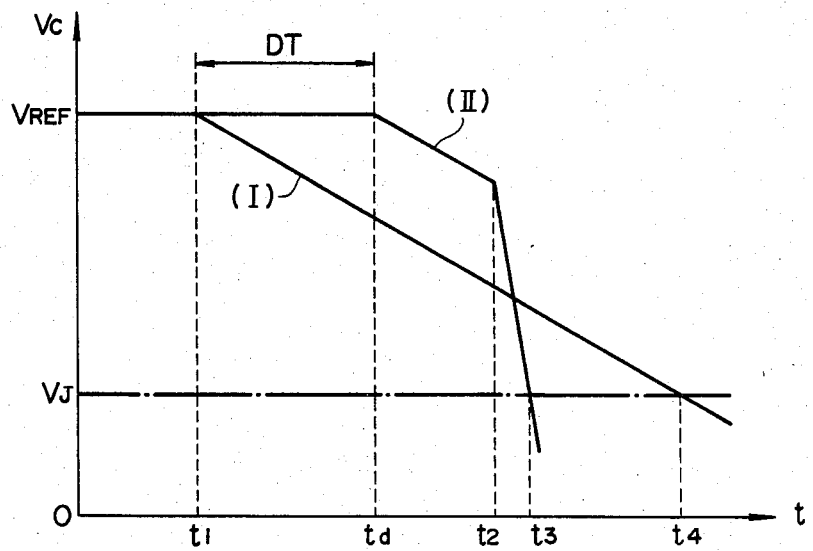
FIG. 3 graphically shows the operation of the apparatus shown in FIG. 2.

The operation of the apparatus will be described with reference to a timing chart shown in FIG. 3. When a TTL "automatic electronic flash" is mounted on the single lens reflex camera which incorporates the apparatus for controlling the emission of an electronic flash, constructed as mentioned above, and the power switch of both units are turned on, the supply voltage Vcc is applied to the terminals 30, 51, 62 and 67, and the reference voltage $V_{REF}$ is applied to the terminals 22, 34. If the variable resistor 35, which is used to preset a film speed, has a resistance $R_{ASA}=0$, the same voltage is applied across the base and emitter of the transistors 37, 38. Accordingly, representing the resistance of resistor 40 by $R_{40}$, a collector current of an equal magnitude as represented by $V_{REF}/R_{40}$ flows through the transistors 37, 38. Representing a variation of the resistance of the variable resistor 35 which corresponds to 1 EV of the film speed value Sv by $\Delta R_{ASA}$, it follows that $$\Delta R_{ASA} \cdot I_j = kT/q \cdot \ln 2$$

where k represents Boltzmann's constant, T absolute temperature, q the charge of an electron and $I_j$ a current flow through the source 36. If the variable resistor 35 has a value of $N \cdot \Delta R_{ASA}$ (where N represents a constant), the collector current of the transistor 38 is expressed as $(V_{REF}/R_{40})^{N+1}$. The same current flows through the transistors 41 and 42 as a result of the current mirror effect. Accordingly, a decision voltage $V_J$ supplied to the non-inverting input of the amplifier 28 is expressed as follows:

$$V_J = R_{39} \cdot (V_{REF}/R_{40})^{N+1}$$

where $R_{39}$ represents the resistance of resistor 39. A voltage which is approximately equal to $N \cdot \Delta R_{ASA} \cdot I_j$ is applied to the film speed input 44 of the circuit 43. Before the shutter release, the output of the gate 59 assumes a high level (hereafter abbreviated by "H" level), thus closing the analog switch 23. Accordingly, the reference voltage $V_{REF}$ is applied from the output of the amplifier 21 to the non-inverting input of the amplifier 25 through the analog switch 23 and the diode 24, thus allowing the integrating capacitor 27 to be charged to the level of the reference voltage $V_{REF}$. As shown in FIG. 1, light from an object being photographed passes through the taking lens 1 and is reflected by the auxiliary mirror 3 to be incident upon the transducer element 26, which therefore produces a photocurrent $I_{p1}$, in accordance with the amount of light incident thereon. The photocurrent $I_{p1}$ flows from the anode to the cathode of diode 24. The potential at the cathode of the diode 24 is equal to the potential at the output of the amplifier 25, which is in turn constrained by the amplifier 21 to be equal to the reference voltage $V_{REF}$. Accordingly, the potential at the anode of the diode 24 is equal to $V_{REF} + kT/q \cdot \ln(I_{p1}/I_s)$ where $I_s$ represents an inverse saturation current of the transducer element 26. This logarithmically compressed voltage is supplied to the brightness input 46 of the circuit 43, and corresponds to a difference between the brightness value Bv of an object being photographed and the open diaphragm aperture value Avo used in the APEX calculation. It is to be noted that the logarithmically compressed signal is also introduced into a finder display, not shown. For example, during an exposure control with preset diaphragm, an APEX calculation circuit within the circuit 43 takes place on the basis of the aperture value Av, film speed value Sv, and the brightness value Bv-Avo, and an exposure period which is based on the time value Tv is displayed. The time value Tv which is calculated within the circuit 43 is also compared against a synchronized period of Tv=6(1/60 second), for example, within a decision circuit contained within the circuit 43. If the result of the decision indicates that Tv>6, or the calculated exposure period is less than the synchronized period, the circuit 43 produces a signal of "H" level, at its output 47. If the result of the decision indicates that Tv≦6, or the calculated exposure period exceeds the synchronized period, a signal of a low level (hereafter abbreviated as "L" level) is developed at the output 47 of the circuit 43.

(1) Assuming that the decision indicates that Tv>6, the signal of "H" level at the output 47 of the circuit 43 enables the gate 48, which produces an output of "L" level since the trigger switch 52 is turned on when the shutter winding operation is completed. Accordingly, the gate 59 produces an output of "H" level, which maintains the analog switch 43 closed or on. As a result, the integrating capacitor 27 is charged to the level of the reference voltage $V_{REF}$, as mentioned previously, and a logarithmically compressed signal corresponding to the magnitude of the photocurrent $I_{p1}$ is supplied to the circuit 43 together with a corresponding display. In response to the shutter release, the trigger switch 52 is turned off in synchronism with the running of the first blind, changing one input to the gate 48 to "L" level, whereby the output of the gate 48 changes to its "H" level. On the other hand, the output of the gate 50 remains at its "H" level, and accordingly, the gate 59 produces an output of "L" level, thus turning the analog switch 23 off. Thus, the analog switch 23 is turned off as a result of opening the trigger switch 52 at time $t_1$ when the first blind begins to run. As the analog switch 23 is turned off, the charging path for the integrating capacitor 27 is interrupted, whereby the change on the capacitor 27 begins to be discharged by the photocurrent $I_{p1}$. Representing the capacitance of the integrating capacitor 27 by $C_1$, the integrated voltage or the output voltage $V_C$ across the amplifier 25 changes with a ramp of $V_C = V_{REF} - (I_{p1}/C_1) \cdot t$ from time $t_1$, as indicated by solid line curve I of FIG. 3. The output voltage $V_C$ from the amplifier 25 is compared against the decision voltage $V_J$ by the amplifier 28. As long as the voltage $V_C$ is higher than the decision voltage $V_J$, the output of the amplifier 21 remains at its "L" level, thus maintaining the electromagnet energized and thus constraining the second blind. Since the result of decision for the APEX calculation is Tv>6, a signal of "H" level is developed at the output 47 of the circuit 43 and is applied through the inverter 60 to one input of NAND gate 61 as an "L" level signal. Accordingly, at time $t_2$ when the running of the first blind is completed, the X-contact switch 63 changes from its off to its on condition, but the output of gate 61 remains at its "L" level, so that the transistor 66 cannot be turned on and the thyristor 68 remains non-conductive. Thus, the X-contacts remain without effect, preventing the electronic flash from emitting flashlight at time $t_2$. An integrating operation takes place in response to natural light input, and at time $t_4$ when the output voltage $V_C$ from the amplifier 25 becomes less than the decision voltage $V_J$, the output of the amplifier 28 changes to its "H" level, thus deenergizing the electromagnet 29 to release the second blind for running.

(2) If the result of the decision indicates that Tv≦6, a signal of "L" level is developed at the output 47 of the circuit 43, and the trigger switch 52 is turned on as the shutter has been wound up. Accordingly, one input to the gate 50 is at its "H" level due to the presence of the inverter 49, and the other input is also "H" level due to the presence of the inverter 54, delay circuit 54 and the inverter 58. Thus, the gate 50 produces an output of "L" level, whereby the gate 59 produces an output of "H"

level, thus maintaining the analog switch 23 on. Accordingly, the integrating capacitor 27 is charged to the level of the reference voltage $V_{REF}$ as before, and a logarithmically compressed signal corresponding to the magnitude of the photocurrent $I_{p1}$ is supplied to the circuit 43, together with a corresponding display. In response to the shutter release, the trigger switch 52 is turned off in synchronism with the beginning of running of the first blind, whereby the output of the inverter 54 changes to its "H" level. Then, the output of the inverter 58 changes to its "L" level after a given time delay DT determined by the values of the resistor 55 and the capacitor 56 in the delay circuit 57. Since the output of the gate 48 remains at its "H" level, the output of the gate 59 changes to its "L" level, turning the analog switch 23 off. Thus, the analog switch 23 is turned off at a delay time DT after the time $t_1$ when the first blind begins to run. As the analog switch 23 is turned off, the charge on the capacitor 27 discharges through the photocurrent $I_{p1}$. Hence the output voltage Vcc of the amplifier 25 changes with a ramp of $V_C = V_{REF} - (I_{p1}/C_1) \cdot t$ from time td which is the time delay DT after the time $t_1$, as indicated by a solid line curve (II) shown in FIG. 3. The circuit 43 produces an output of "L" level, and accordingly one input to the gate 61 changes to its "H" level due to the presence of the inverter 60. When the other input of the gate 61 changes to its "H" level as a result of the X-contact switch 63 being turned on at time $t_2$ when the first blind completes its running, the gate 61 produces an output of "L" level. Accordingly, the transistor 66 is turned on to render the thyristor 68 conductive, whereby the X-contact becomes conductive. This allows an emission signal to be supplied to the electronic flash, causing it to emit flashlight. As the electronic flash emits flashlight to illuminate an object being photographed, and such light is reflected by the film surface to impinge upon the transducer element 26, the magnitude of the photocurrent $I_{p1}$ increases rapidly, whereby the output voltage $V_C$ of the amplifier 25 changes with steeper ramp from time $t_2$ on. An integrating operation then continues, principally integrating the flashlight, and at time $t_3$ when the voltage $V_C$ becomes less than the decision voltage $V_J$, the output of the amplifier 28 changes from its "L" level to its "H" level, thus deenergizing the electromagnet 29 and allowing the second blind to begin running. At the same time, the output of the inverter 31 changes from its "H" level to its "L" level, delivering an emission terminate signal to the electronic flash, thus ceasing the emission of flashlight from the electronic flash.

What is claimed is:

1. An apparatus for controlling the emission of an electronic flash used in a photographic camera of the type in which the photometry of reflection from a film surface is effected, comprising:
    a photocurrent integrator for integrating a photocurrent which is produced by a photoelectric transducer element upon which light impinges as it is reflected from the surface of a first blind of a shutter and a film surface as it is exposed during the running of the first blind;
    a calculation circuit for calculating an exposure period on the basis of a TTL photometric value which prevails before a shutter release;
    a decision circuit to determine if the calculated exposure period is less or greater than a synchronized period of the shutter;
    an emission control circuit for controlling the emission of an electronic flash in accordance with a result of the decision; and
    a delay circuit for delaying the initiation of an integrating operation of the photocurrent by a given time interval with respect to the beginning of running of the first blind if the result of the decision indicates that the emission of the electronic flash is allowed.

2. An apparatus according to claim 1 in which the exposure period calculated by the calculation circuit is displayed within a finder of an associated camera.

3. An apparatus according to claim 1 in which the emission control circuit causes the electronic flash to emit flashlight by closing an X-contact switch at the completion of running of the first blind when the result of decision indicates that the calculated exposure period is greater than the synchronized period.

4. An apparatus according to claim 1 in which in the event the result of decision indicates that the calculated exposure period is greater than the synchronized period, the delay circuit is operative to allow an integrating operation of the photocurrent to be initiated at a given time interval after the actuation of a trigger switch which occurs simultaneously with the beginning of running of the first blind.

* * * * *

UNITED STATES PATENT AND TRADEMARK OFFICE
CERTIFICATE OF CORRECTION

PATENT NO. : 4,509,845
DATED : April 9, 1985
INVENTOR(S) : Kazunori Mizokami

It is certified that error appears in the above-identified patent and that said Letters Patent is hereby corrected as shown below:

```
Column 3 line 62, delete "the same as 12 in Fig. 1" and
insert --(the same as 12 in Fig. 1),--.

Column 3 lines 65-66, delete "same as 13 in Fig. 1" and
insert --(same as 13 in Fig. 1)--.
```

Signed and Sealed this

Ninth Day of July 1985

[SEAL]

Attest:

DONALD J. QUIGG

*Attesting Officer*  *Acting Commissioner of Patents and Trademarks*